United States Patent
Pan et al.

(10) Patent No.: US 9,252,833 B2
(45) Date of Patent: Feb. 2, 2016

(54) POWER EFFICIENT DRIVER ARCHITECTURE

(75) Inventors: Hui Pan, Irvine, CA (US); Yuan Yao, Irvine, CA (US); Joseph Aziz, Irvine, CA (US); Derek Tam, Irvine, CA (US); Xin Wang, Tustin, CA (US); Chia-Jen Hsu, Irvine, CA (US)

(73) Assignee: BROADCOM CORPORATION, Irvine, CA (US)

( * ) Notice: Subject to any disclaimer, the term of this patent is extended or adjusted under 35 U.S.C. 154(b) by 215 days.

(21) Appl. No.: 13/465,216

(22) Filed: May 7, 2012

(65) Prior Publication Data

US 2013/0294294 A1 Nov. 7, 2013

(51) Int. Cl.
*H04B 1/56* (2006.01)
*H04B 1/58* (2006.01)

(52) U.S. Cl.
CPC ............... *H04B 1/586* (2013.01); *H04B 1/583* (2013.01)

(58) Field of Classification Search
CPC ............................... H04L 5/1423; H03H 7/46
USPC ............. 370/276, 395.53; 375/222, 257, 297; 341/144; 327/108
See application file for complete search history.

(56) References Cited

U.S. PATENT DOCUMENTS

| | | | | |
|---|---|---|---|---|
| 3,973,089 A * | 8/1976 | Puckette | ................... | H04B 1/52 379/395 |
| 4,377,858 A * | 3/1983 | Treiber | ................... | H04Q 11/04 370/276 |
| 5,311,114 A * | 5/1994 | Sambamurthy et al. | ...... | 370/296 |
| 5,317,441 A * | 5/1994 | Sidman | ........................... | 398/41 |
| 5,568,064 A * | 10/1996 | Beers et al. | ...................... | 326/31 |
| 6,175,255 B1 * | 1/2001 | Mohan | .......................... | 327/108 |
| 6,351,185 B1 * | 2/2002 | Amrany et al. | ............... | 330/253 |
| 6,580,760 B1 * | 6/2003 | Larsen | .......................... | 375/257 |
| 6,788,745 B1 * | 9/2004 | Lim | ..................... | H04L 25/0298 375/297 |
| 6,844,837 B1 * | 1/2005 | Sutardja | ................... | H03K 5/01 341/144 |
| 7,312,739 B1 * | 12/2007 | Sutardja | ................ | H03M 1/661 341/143 |
| 7,639,598 B2 | 12/2009 | Sovenyi | | |
| RE41,831 E * | 10/2010 | Sutardja et al. | ............... | 341/144 |
| 8,452,001 B1 * | 5/2013 | Roo | .......................... | 379/399.01 |

(Continued)

FOREIGN PATENT DOCUMENTS

| | | |
|---|---|---|
| EP | 1 241 799 A1 | 9/2002 |
| TW | 435000 B | 5/2001 |
| WO | 99/45655 A1 | 9/1999 |

OTHER PUBLICATIONS

Mahadevan, Rajeevan "A Front-end Circuit for Full-Duplex Transmission over Coaxial Cable" University of Toronto-Copyright 1999.*

(Continued)

*Primary Examiner* — Gregory Sefcheck
*Assistant Examiner* — Jael Ulysse
(74) *Attorney, Agent, or Firm* — Oblon, McClelland, Maier & Neustadt, L.L.P.

(57) ABSTRACT

Disclosed are various embodiments for providing a power-efficient driver architecture supporting rail-to-rail operation in full duplex mode. A driver is configured to drive a duplex signal over a transmission medium. A hybrid is configured to recover a received signal from the duplex signal. The received signal is generated by a remote transceiver. The driver is configured to drive the duplex signal based at least in part on the received signal recovered by the hybrid.

18 Claims, 4 Drawing Sheets

(56) References Cited

U.S. PATENT DOCUMENTS

| | | | | |
|---|---|---|---|---|
| 2001/0016021 | A1* | 8/2001 | Chan | H04B 1/586 375/346 |
| 2001/0024498 | A1* | 9/2001 | Joffe | H04B 1/586 379/406.01 |
| 2002/0041193 | A1* | 4/2002 | Tamura | H04L 5/1423 326/86 |
| 2002/0106031 | A1* | 8/2002 | Ebuchi et al. | 375/257 |
| 2002/0176569 | A1* | 11/2002 | Casier et al. | 379/402 |
| 2003/0071603 | A1* | 4/2003 | Sato | G05F 1/561 323/314 |
| 2003/0142688 | A1* | 7/2003 | Chou et al. | 370/420 |
| 2004/0096005 | A1* | 5/2004 | Zabroda | H04L 12/413 375/257 |
| 2004/0218753 | A1* | 11/2004 | Casier et al. | 379/402 |
| 2005/0180559 | A1* | 8/2005 | Pisoni | H04B 3/23 379/406.12 |
| 2006/0067515 | A1* | 3/2006 | Latte | 379/399.01 |
| 2007/0071079 | A1* | 3/2007 | Bella et al. | 375/222 |
| 2007/0127501 | A1* | 6/2007 | Zabroda | 370/395.53 |
| 2009/0052099 | A1* | 2/2009 | Chee | H04B 1/48 361/56 |
| 2010/0048146 | A1* | 2/2010 | McCallister | H04B 1/525 455/78 |
| 2010/0245145 | A1* | 9/2010 | Motamed | H03M 1/682 341/144 |
| 2012/0250587 | A1* | 10/2012 | Pandey et al. | 370/276 |

OTHER PUBLICATIONS

Mahadevan "A Front-end Circuit for Full-Duplex Transmission over Coaxial Cable" University of Toronto—Copyright 1999.*
European Search Report in co-pending, related EP Application No. 12008556.8, mailed Aug. 7, 2013.
Office Action mailed Jun. 10, 2014, in Taiwanese Patent Application No. 101147828.

* cited by examiner

POWER EFFICIENT DRIVER ARCHITECTURE

BACKGROUND

Compared with newer forms of Ethernet, 10Base-T Ethernet employs a greater line voltage swing of 5.0 V at the line driver. 100Base-T Ethernet employs a line voltage swing of 2.0 V, while 1000Base-T Ethernet employs a line voltage swing of 4.0 V. To handle these different characteristics, a multi-mode Ethernet transceiver may employ multiple line drivers. Such line drivers may be current-mode line drivers and/or voltage-mode line drivers.

A current-mode line driver may correspond to a Norton equivalent circuit having a floating current source. Since the current source is high impedance, the output impedance of the driver may be formed by a termination resistance in parallel with the load. The current used by a current-mode line driver may be high because the impedance seen by the current source is the termination impedance in parallel with the load impedance. For example, half of the current may be consumed by the termination impedance. Thus, more current is required to create the voltage swing across the load that terminates the line at the remote end.

By contrast, with a voltage-mode line driver, a differential voltage source may drive the line with a very low impedance. The local termination impedance may be in series connection with the voltage source and may consume, for example, half of the voltage drop of the voltage source. Compared to the voltage-mode line driver, the current-mode line driver may be driven from lower supply voltages and may be easier to implement but may consume more power.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to a power-efficient line driver architecture using merged duplex currents. The line driver architecture may provide class B (or class AB) rail-to-rail operation for full-duplex transmissions. Previous line drivers are less power efficient because of overhead in dealing with the duplex currents (e.g., transmit and receive signals) separately. Further, previous line drivers employ additional output voltage headroom to maintain linear operation in scenarios where both transmit voltage and receive voltage are at their maximum values. By contrast, with rail-to-rail operation, the voltage swings from the maximum available voltage (e.g., the supply voltage) to the minimum available voltage (e.g., the ground voltage). Rail-to-rail operation leads to lower power consumption in comparison to drivers employing additional output voltage headroom.

In addition, some multi-mode Ethernet transceivers may have utilized multiple line drivers to accommodate the various modes. For example, previous multi-mode Ethernet transceivers may have included a voltage-mode line driver for one or more modes and a current-mode line driver for one or more other modes. The line driver architecture described herein provides power efficient operation while in current mode, which may be used to simplify transceiver designs that previously employed multiple line drivers. Also, voltage-mode line drivers may use relatively high supply voltages, while the current-mode line driver described herein supports process scaling with rail-to-rail operation.

Figure 1:
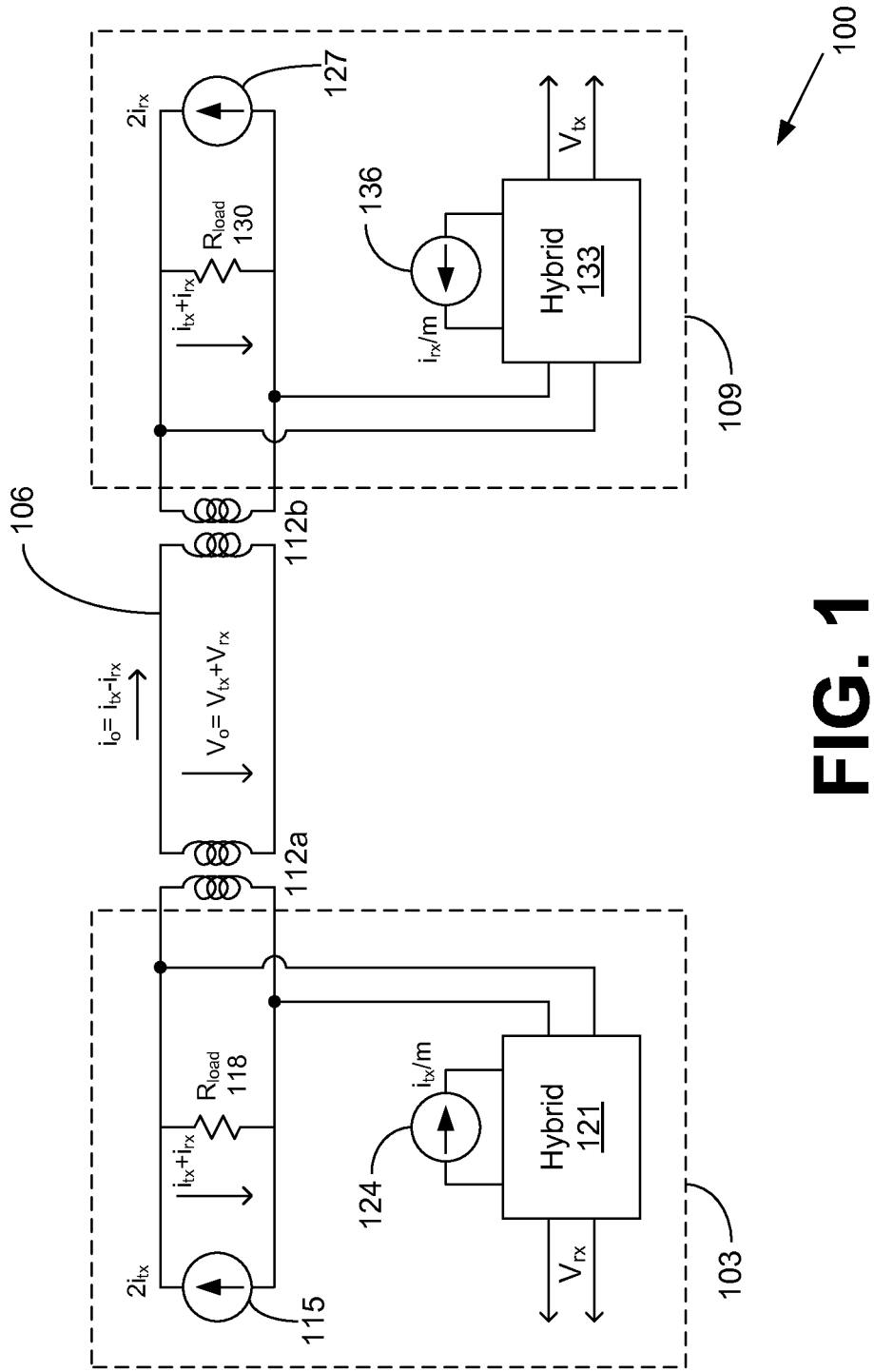
FIG. 1 is a block diagram illustrating an exemplary duplex communication system.

FIG. 1 is a block diagram illustrating an exemplary duplex communication system 100. The duplex communication system 100 includes a transceiver 103, a transmission medium 106, and a remote transceiver 109. In the duplex communication system 100, a full-duplex mode of operation may be supported where the transceiver 103 and the remote transceiver 109 are able to communicate simultaneously over the same transmission medium 106. The duplex communication system 100 may correspond to Ethernet communication, digital subscriber line (DSL) communication, cable modem communication, and/or other systems of communication which may be wired or wireless. The transmission medium 106 may correspond to wired electrical transmission media such as, for example, twisted-pair, coaxial cable, etc. In the example of FIG. 1, a pair of transformers 112a and 112b may provide electrical common mode isolation at the ends of the transmission medium 106.

Although the present disclosure discusses electrical signals in the forms of analog current and voltage, it is understood that the principles of the present disclosure may be extended to electromagnetic wave-based signals, such as radio-frequency signals, infrared signals, optical signals, and so on involving modulation of light intensity or electromagnetic fields. Thus, the transmission medium 106 may include optical transmission media such as fiber optics, etc. and/or wireless transmission media that carry signals such as radio-frequency waves, infrared, etc.

The transceiver 103 may include, for example, a current source 115, a load impedance ($R_{load}$) 118, a hybrid 121, a hybrid current source 124, and other components. The remote transceiver 109 may include, for example, a current source 127, a load impedance ($R_{load}$) 130, a hybrid 133, a hybrid current source 136, and other components. The remote transceiver 109 may or may not be a mirror of the transceiver 103. The transmitted signal generated by the transceiver 103 is denoted as $i_{tx}$ (current) or $V_{tx}$ (voltage), and the received signal generated by the remote transceiver 109 is denoted as $i_{rx}$ (current) or $V_{rx}$ (voltage) in FIG. 1. The relationships between current and voltage are $i_{rx}=V_{rx}/R_{load}$ and $i_{tx}=V_{tx}/R_{load}$.

In the example of FIG. 1, the current source 115 is configured to provide current of $2 \times i_{tx}$ to account for the maximum current seen across $R_{load}$ 118, which is $i_{tx}$ $i_{rx}$. Similarly, the current source 127 is configured to provide current of $2 \times i_{rx}$ to account for the maximum current seen across $R_{load}$ 130, which is $i_{rx}+i_{tx}$. Each of the supply voltages also doubles, which results in a quadrupled power consumption relative to power consumption associated with the transmitted signal itself without duplex operation. The duplex output signal on the transmission medium 106 is denoted by $i_o$ or $V_o$. The output voltage $V_o$ corresponds to the sum $V_{tx}+V_{rx}$. The output current $i_o$ corresponds to the difference $i_{tx}-i_{rx}$.

The hybrid 121 is configured to recover the received signal $V_{rx}$ from the duplex signal $V_o$. Because the hybrid 121 has access to the locally-generated transmitted signal, the hybrid 121 is configured to cancel the transmitted signal from the duplex signal, thus recovering the received signal. The hybrid 121 includes a hybrid current source 124, which produces a current of $i_{tx}/m$, which is a small replica of the locally generated transmitted signal. The factor m is chosen to reduce current consumption.

The hybrid 133 is configured to recover the transmitted signal $V_{tx}$ from the duplex signal $V_o$. Because the hybrid 133 has access to the locally-generated received signal, the hybrid 133 is configured to cancel the received signal from the duplex signal, thus recovering the transmitted signal. The hybrid 133 includes a hybrid current source 136, which produces a current of $i_{rx}/m$.

Figure 2:
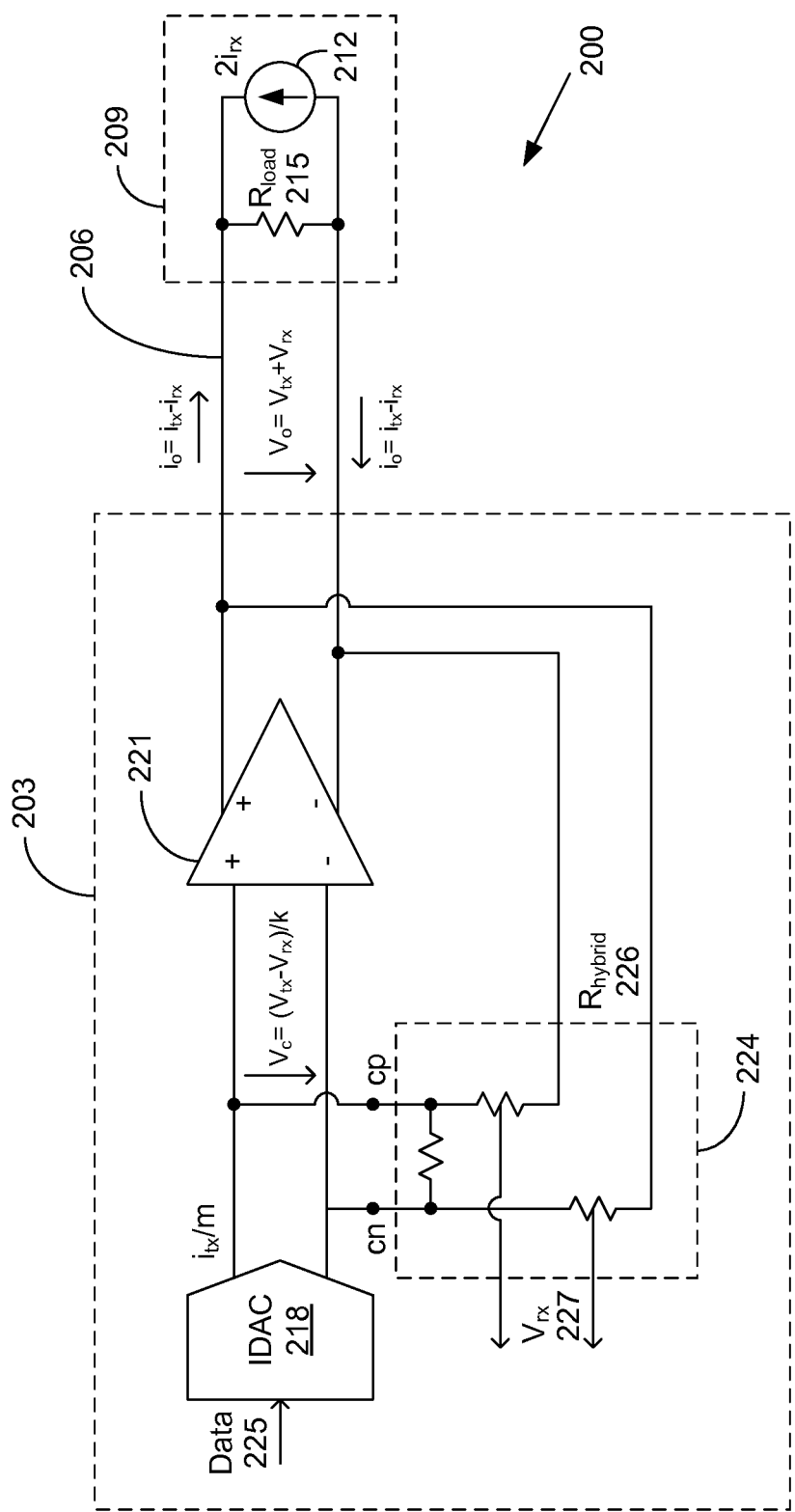
FIG. 2 is a block diagram illustrating another exemplary duplex communication system according to an embodiment of the present disclosure.

FIG. 2 is a block diagram illustrating another exemplary duplex communication system 200 according to an embodiment of the present disclosure. The duplex communication system 200 includes a transceiver 203, a transmission medium 206, and a remote transceiver 209. In the duplex communication system 200, a full-duplex mode of operation may be supported where the transceiver 203 and the remote transceiver 209 are able to communicate simultaneously over the same transmission medium 206. The duplex communication system 200 may correspond to Ethernet communication, digital subscriber line (DSL) communication, cable modem communication, and/or other systems of communication which may be wired or wireless. The transmission medium 206 may correspond to wired transmission media such as, for example, twisted-pair, coaxial cable, fiber optic cable, etc., or wireless transmission media that carry signals such as radio-frequency waves, infrared, etc. A pair of transformers 112 (FIG. 1) may provide electrical common mode isolation at the ends of the transmission medium 206.

The duplex output signal on the transmission medium 206 is denoted by $i_o$ or $V_o$. The output voltage $V_o$ corresponds to the sum of the transmitted signal $V_{tx}$ plus the received signal $V_{rx}$. The output current $i_o$ corresponds to the difference between the transmitted current $i_{tx}$ and the received current $i_{rx}$.

The remote transceiver 209 may be the same as or different from the transceiver 203. In one embodiment, the remote transceiver 209 may correspond to the remote transceiver 109 (FIG. 1). As shown in this example, the remote transceiver 209 may include a current source 212 producing a current of $2\times i_{rx}$ and a load impedance ($R_{load}$) 215. The remote transceiver 209 may also include a hybrid 133 (FIG. 1) and additional circuitry not shown.

The transceiver 203 includes a current-mode digital-to-analog converter (IDAC) 218, a voltage-controlled current source 221, a hybrid 224, and other components. The IDAC 218 takes as input a digital data signal 225 and generates a transmitted signal $i_{tx}/m$, where m may be much greater than 1, e.g., 10 or some other factor. The hybrid 224 is used to recover the received signal from the duplex signal present on the transmission medium 206. The hybrid impedance ($R_{hybrid}$) 226 may be much greater than the load impedance ($R_{load}$) of the transceiver 203 at the voltage-controlled current source 221. The hybrid 224 produces the received signal $V_{rx}$ 227 with some attenuation and a control signal $V_c$, which is the control input to the voltage-controlled current source 221.

The voltage-controlled current source 221 may be a Gm cell having the Gm value of $k/R_{load}$, where k=2 or another value. The control signal $V_c$ corresponds to the difference between the transmitted voltage and the received voltage $V_{tx}-V_{rx}$, divided by a constant factor k, e.g., where k=2 or another value. The control signal $V_c$ is extracted from $V_o$ by superimposing $V_{tx}=i_{tx}\times R_{load}$ on $-V_o/2$ at the hybrid 224 port (cp, cn). The received signal input $V_{rx}$ 227 is readily available from the differential nodes where $V_{tx}$ nulls on the hybrid 224 resistor string.

The architecture depicted in FIG. 2 enables full-duplex drivers that approach the fundamental limit in power efficiency through the use of rail-to-rail voltage swings and partial cancellation of duplex currents. The voltage-controlled current source 221 may use a class B or class AB output stage to source $i_o$ directly from the power supply. Under the architecture shown in FIG. 2, no extra voltage headroom is used in the class B or class AB output stage at the maximum voltage swing when $V_{tx}=V_{rx}=V_{max}$ and $i_o=(V_{tx}-V_{rx})/R_{load}=0$. As a result, the voltage-controlled current source 221 may eliminate the overhead of dealing with the duplex currents separately and may enable power efficient rail-to-rail operation.

A class B output stage using two transistor devices in a push-pull arrangement may offer excellent power efficiency. However, class B output stages may also suffer from crossover distortion resulting from switching from one device to another. In some cases, a class AB output stage may be used instead. A class AB output stage employs a small quiescent current so that the devices are not completely off when they are not in use. Consequently, class AB stages sacrifice some power efficiency in favor of linearity.

Figure 3:
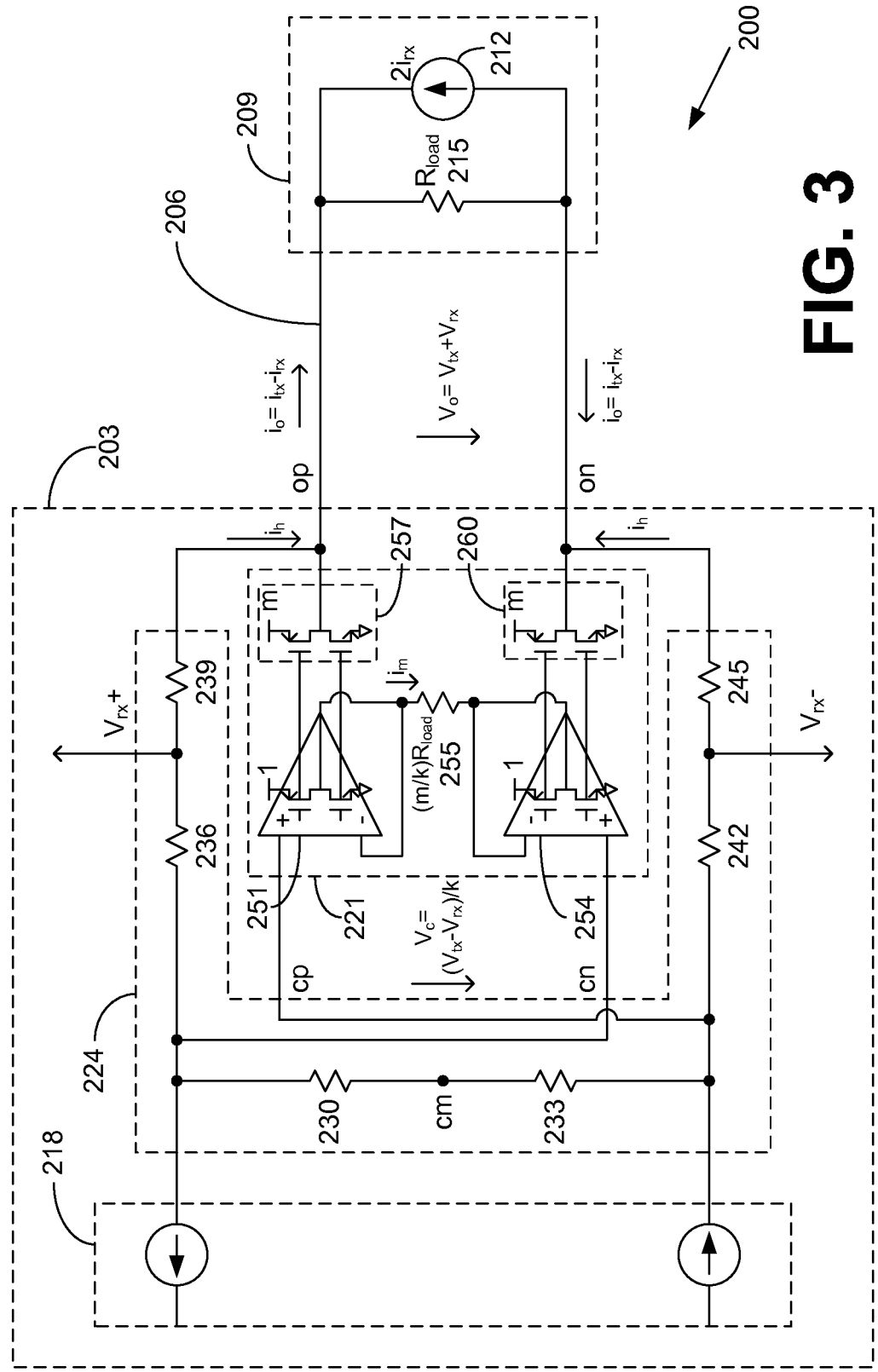
FIG. 3 shows a circuit-level diagram showing one example implementation of the exemplary duplex communication system of FIG. 2 according to an embodiment of the present disclosure.

FIG. 3 shows a circuit-level diagram showing one example implementation of the exemplary duplex communication system 200 (FIG. 2) according to an embodiment of the present disclosure. The duplex communication system 200 includes a transceiver 203, a transmission medium 206, and a remote transceiver 209 as in FIG. 2. The transceiver 203 includes an IDAC 218, a voltage-controlled current source 221 as a driver, a hybrid 224, and other components.

The hybrid 224 is depicted with resistors 230, 233, 236, 239, 242, and 245 in an exemplary arrangement. Although discussed as being resistors, such resistors may correspond to other components having impedance values. In one example, the resistors 230 and 233 may have the values $(k+2)/4\times m\times R_{load}$, the resistors 236 and 242 may have the values $(\frac{1}{3})\times(k+2)/4\times m\times R_{load}$, and the resistors 239 and 245 may have the values $(\frac{2}{3})\times(k+2)/4\times m\times R_{load}$, where k=2 or another factor. The received voltage $V_{rx}+$ is split off between the resistors 236 and 239, while the received voltage $V_{rx}-$ is split off between the resistors 242 and 245. A hybrid current $i_h$ flows from resistor 245 to output port on and a hybrid current $i_h$ flows from resistor 239 to output port op. The value of $i_h$ may be close to zero and negligible.

For applications depending on output linearity, the voltage-controlled current source 221 may comprise closed-loop voltage buffers 251, 254 driving a replica load resistance 255 of $(m/k)\times R_{load}$, and current mirrors 257, 260 amplifying and copying a small replica current $i_m=V_c/[(m/k)\times R_{load}]=i_o/m$ flowing through this resistance 255 to the load $R_{load}$ 215. As in FIG. 2, the current mirror gain m may be selected to be much greater than 1, e.g., 10 or another value. The class B or class AB output stages of the voltage-controlled current source 221, which correspond to the current mirrors 257, 260, may form an H-bridge driver topology featuring active termination intrinsically and rail-to-rail operation in full-duplex mode.

It is noted that the operation of the transceiver 203 may be reconfigured for multiple different physical medium dependent (PMD) modes using the same driver circuitry depicted in FIGS. 2 and 3. Such different PMD modes may use different voltage swings. For example, the same driver circuitry may be configured to support 10Base-T Ethernet or 1000Base-T Ethernet as desired.

Figure 4:
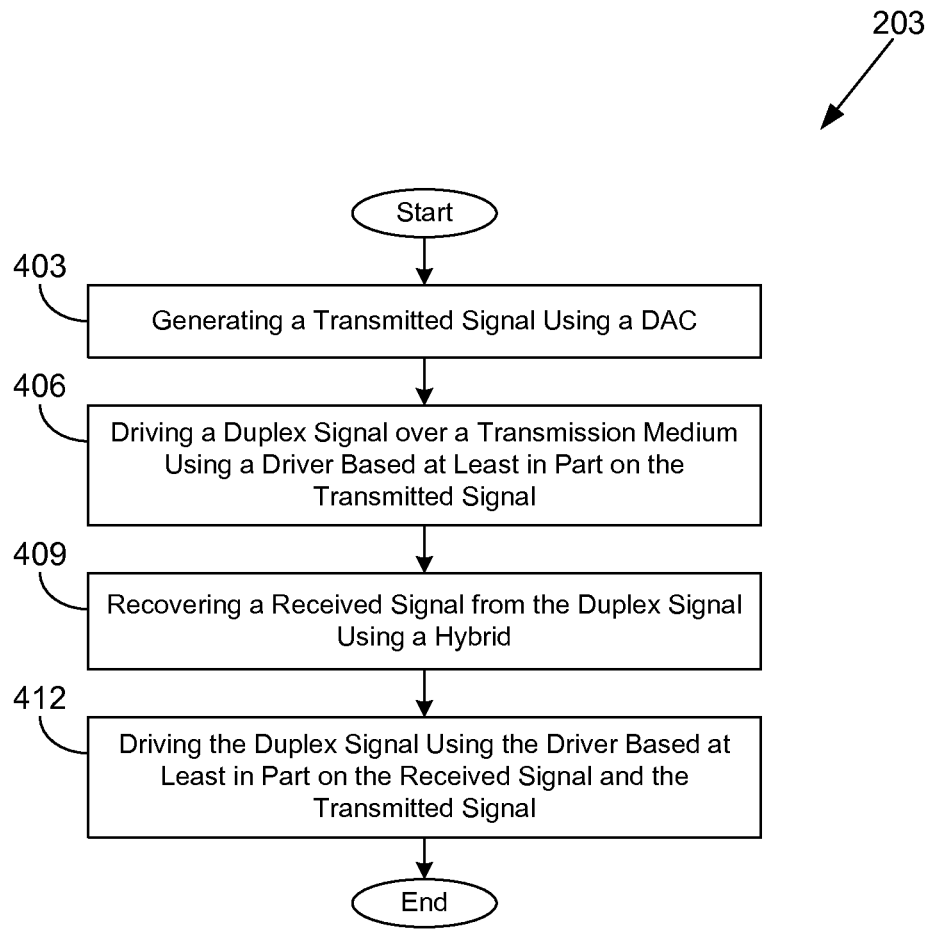
FIG. 4 is a flowchart illustrating one example of functionality implemented in a transceiver in the exemplary duplex communication system of FIG. 2 according to an embodiment of the present disclosure.

FIG. 4 is a flowchart illustrating one example of functionality implemented in a transceiver 203 in the exemplary duplex communication system 200 (FIG. 2) according to an embodiment of the present disclosure. It is understood that the flowchart of FIG. 4 provides merely an example of the many different types of functional arrangements that may be employed to implement the operation of the transceiver 203 as described herein.

Beginning with reference numeral 403, the transceiver 203 generates a transmitted signal from a digital data signal 225 (FIG. 2) using a digital-to-analog converter such as an IDAC 218 (FIG. 2). In reference numeral 406, the transceiver 203 drives the duplex signal over a transmission medium 206 (FIG. 2) using a driver including a voltage-controlled current source 221 (FIG. 2) based at least in part on the transmitted signal.

In reference numeral 409, the transceiver 203 recovers a received signal, generated by a remote transceiver 209 (FIG. 2), from the duplex voltage signal using a hybrid 224 (FIG. 2). In reference numeral 412, the transceiver 203 drives the duplex current signal over the transmission medium 206 based at least in part on the received signal recovered by the hybrid 224 and the transmitted signal generated by the IDAC 218. Thereafter, the operation of the transceiver 203 depicted in the flowchart ends.

The flowchart of FIG. 4 shows the functionality and operation of an implementation of portions of the transceiver 203. If embodied in hardware, each block may represent a circuit or a number of interconnected circuits to implement the specified logical function(s). If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc.

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A transceiver, comprising:
   a hybrid configured to recover a received signal from a duplex signal communicated over a transmission medium, and to generate a control signal based in part on the received signal; and
   a driver configured to drive the duplex signal over the transmission medium, the driver including circuitry to
      drive the duplex signal based on the control signal generated by the hybrid,
      provide rail-to-rail voltage swings when the driver operates in a full-duplex operation mode, and
      partially cancel duplex signal currents when the driver operates in the full-duplex operation mode,
      wherein the duplex signal includes a transmitted signal transmitted by the driver and the received signal,
      wherein the control signal comprises a scaled difference of the transmitted signal and the received signal.

2. The transceiver of claim 1, wherein the transmitted signal is generated by a current-mode digital-to-analog converter in the transceiver.

3. The transceiver of claim 1, wherein the driver includes a voltage-controlled current source.

4. The transceiver of claim 3, wherein:
   the control voltage is a control input to the voltage-controlled current source of the driver.

5. The transceiver of claim 1, wherein the driver is configured for class B operation.

6. The transceiver of claim 1, wherein the driver is configured for class AB operation.

7. The transceiver of claim 1, wherein the driver provides intrinsic active termination.

8. The transceiver of claim 1, wherein the driver is configured to provide an H-bridge driver topology with respect to the duplex signal.

9. The transceiver of claim 1, wherein the driver is configured to support a plurality of different physical medium dependent (PMD) modes.

10. The transceiver of claim 9, wherein the different PMD modes have a plurality of different voltage swings.

11. A system, comprising:
    means for recovering a received signal from a duplex signal communicated over a transmission medium, and for generating a control signal based in part on the received signal; and
    means for driving the duplex signal over the transmission medium, the duplex signal including a transmitted signal transmitted by the means for driving and the received signal,
    wherein the means for driving:
       drives the duplex signal based on the control signal generated by the means for recovering,
       provides rail-to-rail voltage swings when the means for driving operates in a full-duplex operation mode, and
       partially cancels duplex signal currents when the means for driving operates in the full-duplex operation mode,
       wherein the control signal comprises a scaled difference of the transmitted signal and the received signal.

12. The system of claim 11, wherein the means for driving is configured for class B operation or class AB operation.

13. A method for driving a duplex signal in a transceiver, comprising:
    recovering a received signal from the duplex signal using a hybrid;
    generating, by the hybrid, a control signal based in part on the received signal; and driving, with a driver, the duplex signal over the transmission medium, the duplex signal including a transmitted signal transmitted in the driving step and the received signal, wherein the driving includes:
- driving the duplex signal based on the control signal generated the hybrid,
- driving the duplex signal using rail-to-rail voltage swings when the driver operates in a full-duplex operation mode, and
- partially canceling duplex signal currents when the driver operates in the full-duplex operation mode, wherein the control signal comprises a scaled different of the transmitted signal and the received signal.

14. The method of claim 13, further comprising:
generating a transmitted signal using a digital-to-analog converter.

15. The method of claim 13, wherein the driver is a voltage-controlled current source.

16. The method of claim 13, further comprising:
configuring the transceiver for a first physical medium dependent (PMD) mode employing a first voltage swing; and reconfiguring the transceiver for a second PMD mode employing a second voltage swing that is different from the first voltage swing, wherein the driver supports the first voltage swing and the second voltage swing, and one of the first and second voltage swings corresponds to the rail-to-rail voltage swings for the full duplex mode.

17. The method of claim 13, wherein the driver is configured to provide an H-bridge driver topology with rail-to-rail operation with respect to the duplex signal.

18. The transceiver of claim 13, wherein the control voltage is generated as the product of a constant and the difference between a voltage of the transmitted signal and a voltage of the received signal.

* * * * *